US012787955B2

(12) United States Patent
Wilson et al.

(10) Patent No.: US 12,787,955 B2
(45) Date of Patent: Nov. 10, 2026

(54) WATERING DEVICES

(71) Applicant: EXEL Industries, Epernay (FR)

(72) Inventors: Jack Wilson, Birmingham (GB); Robert Boughton, Birmingham (GB); Marc Ballu, Epernay (FR)

(73) Assignee: Exel Industries, Epernay (FR)

( * ) Notice: Subject to any disclaimer, the term of this patent is extended or adjusted under 35 U.S.C. 154(b) by 0 days.

(21) Appl. No.: 19/089,484

(22) Filed: Mar. 25, 2025

(65) Prior Publication Data

US 2025/0301975 A1 Oct. 2, 2025

(30) Foreign Application Priority Data

Mar. 25, 2024 (GB) .................................... 2404216

(51) Int. Cl.
*A01G 27/04* (2006.01)

(52) U.S. Cl.
CPC .................................. *A01G 27/04* (2013.01)

(58) Field of Classification Search
CPC ........ A01G 27/04; A01G 27/00; A01G 27/06; A01G 27/005; A01G 27/02; A01G 27/006
See application file for complete search history.

(56) References Cited

U.S. PATENT DOCUMENTS 2,084,005 A 6/1937 Lorenzo
2,375,860 A 5/1945 Markham
4,299,054 A 11/1981 Ware
5,129,183 A * 7/1992 Haw ...................... A01G 27/04 47/81
5,193,305 A * 3/1993 Holtkamp, Jr. ........ A01G 27/04 47/81
9,185,853 B1 * 11/2015 Ascherman .............. A01G 9/02
11,758,858 B2 9/2023 Lim et al.
2001/0029699 A1 * 10/2001 Fidotti ................ A01G 27/006 47/79
2006/0277825 A1 12/2006 Sanders
2018/0328513 A1 11/2018 Emory (Continued)

FOREIGN PATENT DOCUMENTS

CA 2571657 A1 1/2006
CN 204616625 U 9/2015

(Continued)

OTHER PUBLICATIONS

IPO Search Report of related GB2404216.0, dated Aug. 20, 2024, 2 pages.

(Continued)

*Primary Examiner* — Kristen C Hayes
(74) *Attorney, Agent, or Firm* — Victor Cardona, Esq; Heslin Rothenberg Farley & Mesiti P.C.

(57) ABSTRACT

A watering device for mounting in a container P includes a sealing portion for mounting against a container wall around an aperture in the container wall, retaining means for holding the sealing portion in position against the container wall, a fluid distribution portion receiving portion for holding a fluid distribution portion at a location outside of a container on which the device is mounted and a flow channel portion for providing a fluid flow path from an interior of a container P in which the watering device is mounted to the fluid distribution portion receiving portion.

31 Claims, 8 Drawing Sheets

(56) References Cited

U.S. PATENT DOCUMENTS

| | | | | |
|---|---|---|---|---|
| 2019/0226160 | A1 | 7/2019 | Kim | |
| 2020/0404868 | A1* | 12/2020 | Adams | A01G 27/02 |
| 2022/0142057 | A1 | 5/2022 | Marshall | |

FOREIGN PATENT DOCUMENTS

| | | | |
|---|---|---|---|
| CN | 213368870 | U | 6/2021 |
| CN | 218680351 | U | 3/2023 |
| JP | 2008220387 | A | 9/2008 |
| KR | 20160060965 | A | 5/2016 |
| TW | 201717747 | A | 6/2017 |

OTHER PUBLICATIONS

IPO Further Search Report of related GB2404216.0, dated Jan. 7, 2025, 2 pages.

European Patent Office, European Search Report, Aug. 13, 2025, 8 pages.

* cited by examiner

WATERING DEVICES

CROSS REFERENCE TO RELATED APPLICATIONS

This is a U.S. Patent Application claiming priority to United Kingdom patent application GB 2404216.0, filed Mar. 25, 2024. The entire disclosure of said application is hereby incorporated herein by reference.

This invention relates to watering devices, in particular garden watering devices for the watering of garden plants.

BACKGROUND

There is a general desire to provide watering devices that can provide unattended watering over a period of time. This of course can reduce the frequency with which a user needs to attend themselves to watering plants of interest.

Sometimes relatively complex irrigation systems are used with one or more timer operated valve or "water computer" controlling the delivery of water from a water source such as a mains water supply. Sometimes it may be to difficult, expensive or otherwise undesirable to install this kind of irrigation based on a mains water supply—say there is a desire to use reclaimed water, collected rain water or so on.

Correspondingly, there can be an attraction in providing simpler or more natural solutions to watering. One traditional option in these cases is the use of an unglazed ceramic, typically terracotta, olla watering pot which is buried in the ground in a region near plants to be watered. The olla is filled with water and this is allowed to seep out gradually into the surrounding earth through the porous material of the pot.

However, there are a number of issues with such olla watering pots. They water a relatively small area (so a relatively large number can be required), they are relatively expensive, and there is little or no control over the rate with which they feed water into the area in which they are located.

Thus it would be desirable to provide alternative forms of watering device which address at least some of the issues outlined above.

SUMMARY OF THE INVENTION

According to a first aspect of the present invention there is provided a watering device for mounting in a container comprising a sealing portion for mounting against a container wall around an aperture in the container wall, retaining means for holding the sealing portion in position against the container wall, a fluid distribution portion for location outside of a container on which the device is mounted and a flow channel portion for providing a fluid flow path from an interior of a container in which the watering device is mounted to the fluid distribution portion.

Such a device can allow water introduced into a container such as a plant pot in which the watering device is mounted to water the surroundings via the flow channel portion and the fluid distribution portion. This can provide a simple and effective way for a user to create an effective watering device from an everyday object—ie a plant pot or other container with an aperture. The sealing portion can be used to seal the aperture against the uncontrolled release of water and instead allow a controlled release.

According to a second aspect of the present invention there is provided a watering device for mounting in a container comprising a sealing portion for mounting against a container wall around an aperture in the container wall, retaining means for holding the sealing portion in position against the container wall, a fluid distribution portion receiving portion for holding a fluid distribution portion at a location outside of a container on which the device is mounted and a flow channel portion for providing a fluid flow path from an interior of a container in which the watering device is mounted to the fluid distribution portion receiving portion.

Preferably the fluid distribution portion comprises a piece of wicking material. This can help draw water from the interior of the container and into the ground surrounding the container. The wicking material can extend a significant distance from the container and help increase the area over which water is released.

The flow channel portion may be for providing a fluid flow path through the watering device to the fluid distribution portion receiving portion.

Typically in use a plant pot or another suitable container will be fitted with the present watering device and then buried or semi buried in the ground in a region to be watered in a manner similar to a traditional terracotta olla watering pot.

Besides plant pots other suitable containers can include buckets, Tupperware™ containers, Aluminium foil containers, large yoghurt pots, ice cream containers and so on.

Containers can be porous or non-porous, of glazed or un-glazed ceramic, of plastics material, metal, say metal foil, or so on.

Where the container already includes a suitable aperture, this is convenient—otherwise an aperture may be made in the container—say by drilling or cutting a hole in the container.

The container just needs to be able hold a volume of water that the user considers sufficient—so some kind of fluid container.

The watering device preferably comprises a valve for adjustably controlling the flow through the fluid flow path. This can help a user control a rate of watering provided by the watering device.

The sealing portion may be arranged to be placed against an outside surface of the container wall.

The sealing portion may be provided adjacent to the fluid distribution portion.

The sealing portion may comprise a ring shaped sealing element. The sealing element may be of resilient material. The sealing portion may comprise a resilient material ring portion.

The use of resilient material can assist in mounting the device on a container as well as helping providing a seal.

The sealing portion may comprise a plate portion on which the sealing element is mounted. The sealing portion may comprise a plate portion on which the resilient material ring portion is mounted.

The plate portion may be of a material which is relatively rigid compared to that of the sealing element.

The retaining means may comprise a clamping member for clamping against a container wall on an opposite side to that against which the sealing portion is arranged to seal.

The retaining means may comprise a joining portion for joining the sealing portion to the clamping portion. The joining portion may be arranged for passing through an aperture in a container wall. The joining portion may join the sealing portion to the clamping portion when the watering device is mounted in a container and be arranged for passing through the aperture in the container wall in this state.

In some embodiments, the joining portion may be rod- or tube-like

The joining portion may be joined to the plate portion of the sealing portion at least when the clamping member and the sealing portion are in an assembled state. The joining portion may be joined to the plate portion of the sealing portion even when the clamping member and the sealing portion are disassembled from one another.

The clamping member may be threadingly engageable with the joining portion. In such a case the watering device may be mounted onto a container by tightening the clamping member onto the joining portion. Preferably this will be with the joining member extending through the aperture in the container wall.

The clamping member may comprise a clamping flange portion for contacting with the container wall against which it is to be clamped.

The clamping member may define a bore which accepts the joining portion.

The clamping member may define at least one clamping member fluid passage from the exterior of the clamping member into the bore.

The clamping flange portion may define the at least one clamping member fluid passage.

The joining portion may comprise a joining portion fluid passage for leading fluid through the watering device. The joining portion may have an inlet port at one end of the fluid passage and an outlet port at the other end of the fluid passage.

The flow channel portion may comprise the clamping member fluid passage and/or the joining portion fluid passage.

The joining portion may comprise a hollow portion, which may be a hollow tubular portion. The hollow portion may provide at least part of the joining portion fluid passage.

The inlet port may be provided in the hollow portion.

The inlet port may provide a fluid communication path between the bore of the clamping member and the interior of the hollow portion when the joining portion is located in the bore of the clamping member.

The outlet port may be provided in the hollow portion.

The outlet port may provide a fluid communication path between the interior of the hollow portion and the fluid distribution portion.

The valve may be arranged to control flow in the joining portion fluid passage, say control flow into and/or out of the interior of the hollow portion.

The valve may be arranged as a needle valve.

The joining portion may be arranged as a hollow tubular threaded stem, which may be such that the clamping portion is threadingly mountable on the stem and the interior of the stem provides a flow path through the watering device.

The watering device may comprise a fluid distribution portion receiving portion for holding the fluid distribution portion in position on the remainder of the watering device.

The sealing portion, say the plate portion of the sealing portion, may comprise the fluid distribution portion receiving portion for holding the fluid distribution portion in position on the remainder of the watering device. The clamping portion may comprise the fluid distribution portion receiving portion.

This is particularly of interest when the fluid distribution portion comprises a piece of wicking material.

The fluid distribution portion receiving portion may comprise a wicking material receiving slot.

The receiving slot may be defined between a main body of the plate portion of the sealing portion and a retaining strip mounted on the main body of the plate portion. The receiving slot may be defined between a main body of the clamping portion and a retaining strip mounted on the main body of the clamping portion.

The fluid distribution portion receiving portion may comprise an outlet pocket into which an outlet feeding fluid to the fluid distribution portion feeds.

For example into which the outlet port of the joining portion feeds.

The outlet pocket may have a surrounding wall with a distal edge that extends into the wicking material receiving slot, such that when a piece of wicking material is located in the slot the distal edge presses into the wicking material.

This can help form a seal against the ingress of dirt/debris into the outlet pocket and hence can help against blocking of the fluid low path through the device. It can also create a low level vacuum or reduced pressure region in the outlet pocket as liquid is wicked away by the wicking material to help maintain flow through the watering device. This can act against the effects of surface tension/meniscus effects which can inhibit flow at the very low rates that are typically observed in use of the present kind of device.

The retaining strip may define an aperture that is aligned with the outlet pocket. The size and shape of the aperture in the strip may be the same as that defined by the distal edge of the surrounding wall of the outlet pocket. Where both are circular, the diameter of the aperture may be the same as the internal diameter of the outlet pocket.

The retaining strip may be movably mounted on the remainder of the watering device and arranged to be moveable between an open position allowing the introduction of a piece of wicking material and a closed position for holding the wicking material in position.

The retaining strip may be hingedly mounted on the remainder of the watering device.

The retaining strip may be arranged to be latchable into the closed position.

The retaining strip may be arranged to clamp the piece of wicking material in position when in the closed position.

The watering device preferably comprises a flow regulator for controlling the flow rate of fluid through the fluid flow path. Preferably, the flow regulator is of a porous material. More preferably, the flow regulator is of a porous ceramic material.

In some embodiments, the flow regulator comprises a porous block. The block may be a disc, that is to say the block may have a substantially circular cross-section. In alternative embodiments, the block may have an elliptical, square, triangular or any other shape cross-section.

In alternative embodiments, the flow regulator comprises a cone. In one such embodiment, the cone may be arranged to protrude into the container when the watering device is mounted on a container. In another such embodiment the cone may be arranged to protrude outside of a container when the watering device is mounted on a container.

The flow regulator may be retained by a housing. The housing may be arranged to be connectable to one of the sealing portion and the clamping member. The housing may be threadingly connectable to one of the sealing portion and the clamping member. The housing may be removable by a user. This allows the user to remove the housing and flow regulator without the need to remove the watering device from the container. This may be advantageous, for example, when cleaning the flow regulator.

The watering device may comprise a first seal between the housing and one of the sealing portion and the clamping member. The watering device may comprise a second seal between the flow regulator and the housing. The first and/or second seal may comprise an O-ring.

The watering device may comprise a filter element for filtering water before reaching the flow regulator. The filter element may prevent dirt and/or debris from blocking the flow regulator. Therefore, the filter element may allow for more consistent fluid flow rates.

The filter element may be provided upstream of the flow regulator. The filter element may be made of a foam material.

The filter element may be retained in the housing.

The housing may comprise a housing body. The housing may comprise a retaining member for retaining the filter element and/or flow regulator in the housing. The retaining member may be engageable with the housing body, say an internal wall of the housing body. The retaining member may be arranged to bias the filter element and/or flow regulator towards the second seal.

The flow regulator may have a first characteristic flow rate and the filter element may have a second characteristic flow rate that is higher than the first characteristic flow rate.

The characteristic flow rate of the flow regulator may be in the range of 50 ml/day to 500 ml/day. Preferably, the characteristic flow rate of the flow regulator is in the range of 100 ml/day to 500 ml/day.

The flow regulator may have a porosity by volume in the range 30 to 70%. Preferably, the porosity by volume may be 40 to 50%.

The flow regulator may have pores with a pore size of 1 μm to 10 μm. Preferably, the pore size may be 1 μm to 5 μm.

The porosity and pore size may be user selectable—that is to say a range of flow regulators, say a range of porous ceramic elements, may be provided to the user for selectable use in the watering device. This allows the user to determine the fluid flow rate through the fluid flow path.

According to a third aspect of the present invention there is provided a watering device for mounting in a container comprising a sealing portion for mounting against a container wall around an aperture in the container wall, a joining portion mounted on the sealing portion for passing through the aperture in a container wall and a clamping portion for mounting on the joining portion for holding the sealing portion in position against the container wall.

The watering device may further comprise a fluid distribution portion receiving portion for holding a fluid distribution portion at a location outside of a container on which the device is mounted. The watering device may further comprise a flow channel portion for providing a fluid flow path from an interior of a container in which the watering device is mounted to the fluid distribution portion receiving portion.

The sealing portion may comprise a fluid distribution portion receiving portion for holding a fluid distribution portion.

The joining portion may define a flow passage for feeding fluid through the watering device, say to the fluid distribution portion receiving portion where present.

According to a fourth aspect of the present invention there is provided a watering device assembly comprising a watering device as defined above mounted on a container with the sealing portion sealing against a wall of the container around an aperture provided in the container.

Note that, in general terms and with any necessary modifications in wording, all of the further features defined above following any aspect of the invention above are applicable as further features of all other aspects of the invention defined above. These further features are not restated after each aspect of the invention merely for the sake of brevity.

BRIEF DESCRIPTION OF THE DRAWINGS

Embodiments of the present invention will now be described, by way of example only, with reference to the accompanying drawings in which.

DETAILED DESCRIPTION

Figure 1:
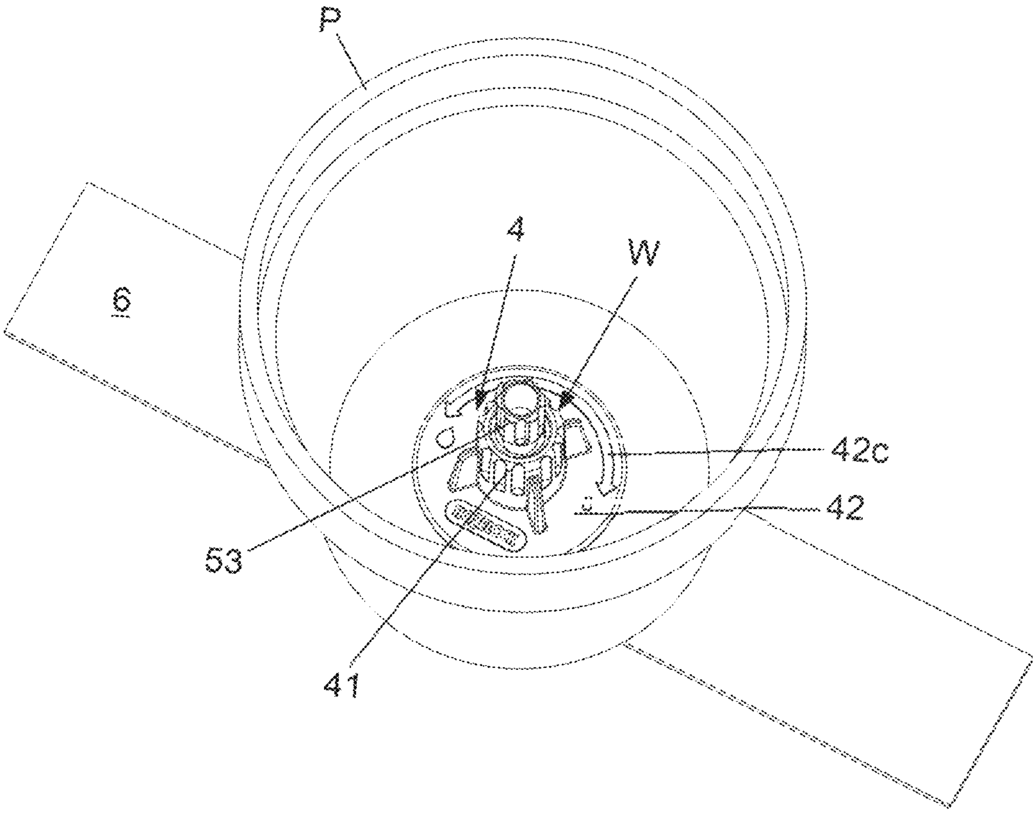
FIG. 1 schematically shows a watering device mounted in a plant pot to form a watering device arrangement.
Figure 2:
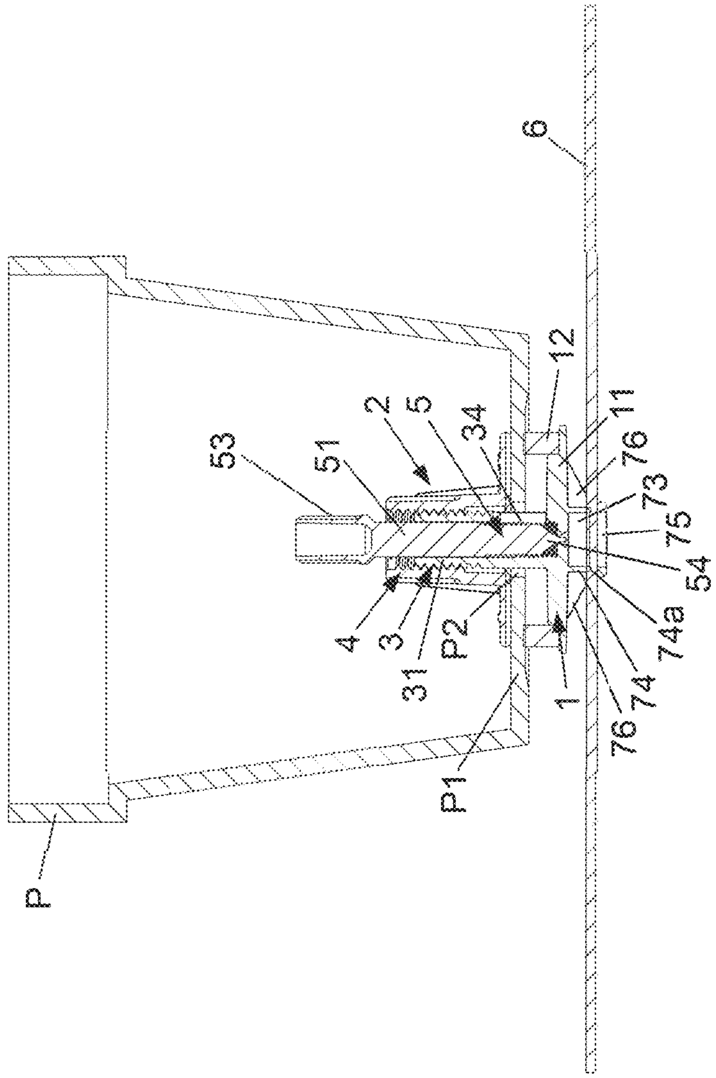
FIG. 2 is a sectional view of the watering device arrangement shown in FIG. 1 with a valve of the watering device in a first position.
Figure 3:
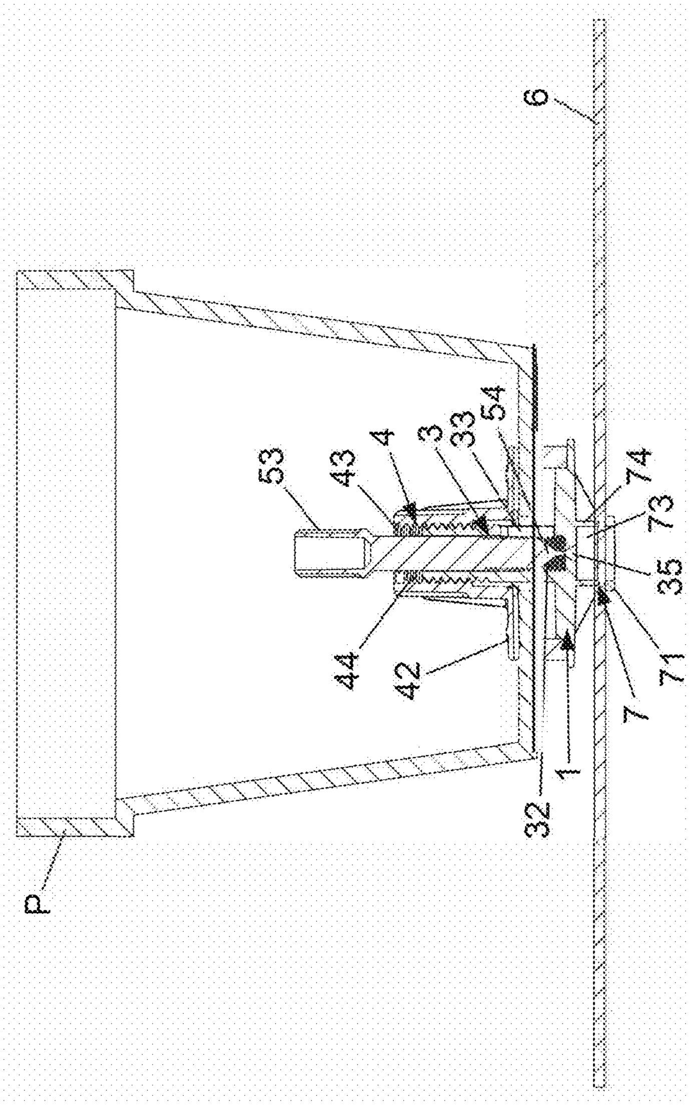
FIG. 3 is a sectional view of the watering device arrangement shown in FIG. 1 with the valve of the watering device in a second position.

FIGS. 1 to 3 show a watering device arrangement which comprises a watering device W mounted in a plant pot P. When the watering device W is mounted in a plant pot P in this way the resulting watering device arrangement may be used to water plants by burying or partially burying the watering device arrangement in earth in which the plants to be watered are growing and filing the plant pot P with water. As will be explained further below, water from the plant pot P is released by the watering device into the surroundings in a controlled manner.

The watering device arrangement may, for example, be provided in a flower bed or fruit/vegetable bed whether this be directly in the ground or raised bed and similarly may be provided in earth used for growing plants where this is provided in some kind of container. Once assembled and used in this way, the watering device arrangement works in an analogous way to a traditional olla watering pot.

If desired a user may provide a lid or cover over the plant pot P in use. The material of the plant pot P is unimportant, although the use of a non-porous pot may prove preferable in at least some cases.

The watering device W is designed to be mounted in an aperture (or hole) in the plant pot—typically, but not necessarily in the base of the plant pot. The watering device arrangement will typically work most effectively if the aperture in which the watering device is mounted is the only hole in the plant pot P at a level below which water is to be filled in the plant pot P. But again this is user choice. In some instances a plant pot with two or more apertures might be provided with a corresponding number of watering devices W—one to be fitted in each aperture which is at or below the waterline in use.

Further the present type of watering device W might be mounted in a container which is something other than a plant pot as mentioned in the introduction and the same benefits obtained. Besides plant pots other suitable containers can include buckets, Tupperware™ containers, Aluminium foil containers, large yoghurt pots, ice cream containers and so on. It will be appreciated that a suitable hole may be made in a container to accept the watering device, if required. For simplicity the remainder of the description refers to the situation where the watering device W is mounted/for mounting in a plant pot.

More detail of the watering device W will now be described with reference to FIGS. 1 to 3 as well as FIGS. 4, which shows the watering device W when not mounted in a pot and FIG. 5 which is an exploded view of most of the parts of the watering device W.

The watering device W comprises a sealing portion 1 which is arranged to seal against a wall of the pot P1 around an aperture P2 provided in the pot wall P1. The watering device W further comprises retaining means 2 for holding the sealing portion 1 in position against the pot wall P1.

In the present embodiment, the sealing portion 1 comprises a plate portion 11 and a resilient material sealing ring portion 12 which is mounted on the plate portion 11 and is arranged for sealing against the pot wall P1 around an aperture P2 in the pot wall P1 when the watering device is mounted in a plant pot P as shown in FIGS. 1 to 3. The sealing ring portion 12 may be provided to the consumer as a separate component to the plate portion 11, or may be provided pre-joined to the plate portion—say joined via adhesive or say produced as a co-moulded component.

In the present embodiment, the retaining means 2 comprises a joining portion 3 and a clamping portion 4. The joining portion 3 in the present embodiment is joined with the plate portion 11 of the sealing portion 1 and is arranged for passing through the aperture P2 in a plant pot when mounted as shown in FIGS. 1 to 3. In the present embodiment the joining portion 3 and the plate portion 11 are formed as a single piece—specifically a plastics material moulded component.

The joining portion 3 is arranged as a hollow tubular portion in particular, a threaded stem portion 31. A bore 32 is provided within the hollow tubular portion 31 and a water inlet port 33 provides a water flow path through the side wall of the joining portion 3 and into the joining portion bore 32.

The clamping portion 4 is arranged to be mounted onto the joining portion 3 and clamp against the opposite side of a pot wall P1 than the sealing portion 1 when the watering device W is mounted in a pot P as shown in FIGS. 1 to 3.

The clamping portion 4 comprises a main body portion 41 and a clamping flange portion 42. The main body portion 41 defines a clamping portion main bore 43. At least one and preferably a plurality of grooves 42*a* are provided in a face 42*b* of the clamping flange portion 42. The face 42*b* is arranged to sit against a pot wall P1 when the watering device W is mounted in a pot P as shown in FIGS. 1 to 3, and the grooves 42*a* act as water passage portions providing a water flow path into clamping portion main bore 43.

As mentioned above the joining portion 3 comprises a threaded stem portion 31. The main bore 43 of the clamping portion 4 comprises a complementarily threaded portion 44 which is arranged to threadingly engage with the joining portion 3 so that the clamping portion 4 may be tightened onto the joining portion 3. For completeness it is noted that these complimentary threads are respectively on the external wall of the stem portion 31 and the internal wall of the main bore 43.

The main body portion 41 may be provided with at least one gripping portion 45 to assist a user in turning the clamping portion 4 during mounting. The at least one gripping portion 45 may comprise a series of recesses and projections 45*a* and/or a plurality of projecting web portions 45*b*—both are provided in the present embodiment. The clamping portion 4 may be provided as a moulded plastics material part.

In mounting the watering device W on a pot P, the joining portion 3 may be fed through an aperture P2 in a pot P so that the sealing portion 1, and in particular the sealing ring portion 12, abuts the pot wall P1 from one side, and the clamping portion 4 is threaded onto the joining portion and screwed into clamping contact with the opposite side of the pot wall P1.

In this embodiment, the sealing portion 1 is arranged to be provided outside of the pot P and the clamping portion 4 inside of the pot P and this is considered a preferable arrangement leading to a straightforward construction especially with regards to provision of and control of a flow path through the device. However, one could envisage alternative arrangements where the sealing portion is arranged to be provided inside of the pot P and a suitable retaining means is provided to hold it in position—which might again include a corresponding joining portion and a clamping portion.

The watering device W comprises a needle valve 5 for controlling the flow rate of water through the watering device W. The needle valve 5 comprises a threaded needle stem 51 which is received in the bore 32 of the joining portion 3. The bore 32 of the joining portion includes an internal threaded portion 34 which is complementary to thread 52 provided on the needle stem 51. The needle stem 51 comprises a user operable knob 53 towards one end and a needle portion 54 at the other end. The knob 53 comprises a series of recesses and projections 53*a* to assist user grip. The threaded needle stem 51 may be provided as a moulded plastics material part.

An outlet port or orifice 35 is provided in the joining portion 3 from the bore 32 to the exterior and the needle portion 54 is arranged to control flow through the outlet port 35. In this embodiment the outlet port 35 passes through the sealing portion 1. In particular, the outlet port 35 is formed in the plate portion 11 of the sealing portion 1.

The threaded needle stem 51 is moveable by a user between different states in which the needle portion 54 obscures the outlet port 35 to greater and lesser extent. The threaded needle stem 51 together with the joining portion 3 can be considered to form the needle valve 5.

FIG. 2 shows the threaded needle stem 51 in a first position and FIG. 3 shows the threaded needle stem 51 in a second position in which the outlet port 35 is less obscured—the valve 5 is more open—than in the first position. The user can move between these different states by turning the needle stem 51 relative to the joining portion 3 using the knob 53. As can be seen in FIGS. 1 and 4, the clamping portion flange portion 42 includes indication markings 42*c* to indicate to a user the direction in which the knob 53 should be turned to increase or decrease flow rate.

When the watering device W is mounted in a pot P and the pot P is filled with water, water can pass from the interior of the pot P through the grooves 42*a* in the underside of the clamping portion 4 and into the main bore 43 of the clamping portion 4. From here water can pass through the inlet port 33 in the joining portion 3 into the bore 32 of the joining portion 3. Then flow out of the bore 32 of the joining portion 3 is controlled by the needle valve 5—in particular the interaction between the needle portion 54 and the outlet port 35.

The watering device W includes a piece of wicking material 6 when complete. The piece of wicking material 6 is shown in position in FIGS. 1 to 4 (though only part of it is shown in FIG. 4). The wicking material 6 is omitted from FIG. 5 for clarity. The wicking material 6 acts as a fluid distribution portion—taking fluid (typically water) from the outlet port 35 and causing it to flow away from the outlet port 35 into the surrounding earth. The wicking material is typically a piece of textile material, say woven textile material, which is selected to provide good wicking properties. The wicking material may comprise laminated capillary matting.

The wicking material 6 may be selected to have a length that is significantly longer than a typical dimension of a pot with which the watering device W is to be used. The piece of wicking material 6 may have a length which is at least twice the length of the diameter of the wall of the pot P in which the watering device W is mounted.

The watering device W comprises a wicking material receiving portion 7 in which the wicking material is mountable on the remainder of the watering device W. The fluid flow path through the watering device leads to the wicking material receiving portion 7—the outlet port 35 leads to the wicking material receiving portion 7. In the present embodiment the wicking material receiving portion 7 is provided on the sealing portion 1. The plate portion 11, joining portion 3, and wicking material receiving portion 7 may be provided as moulded plastics material part.

Figure 4:
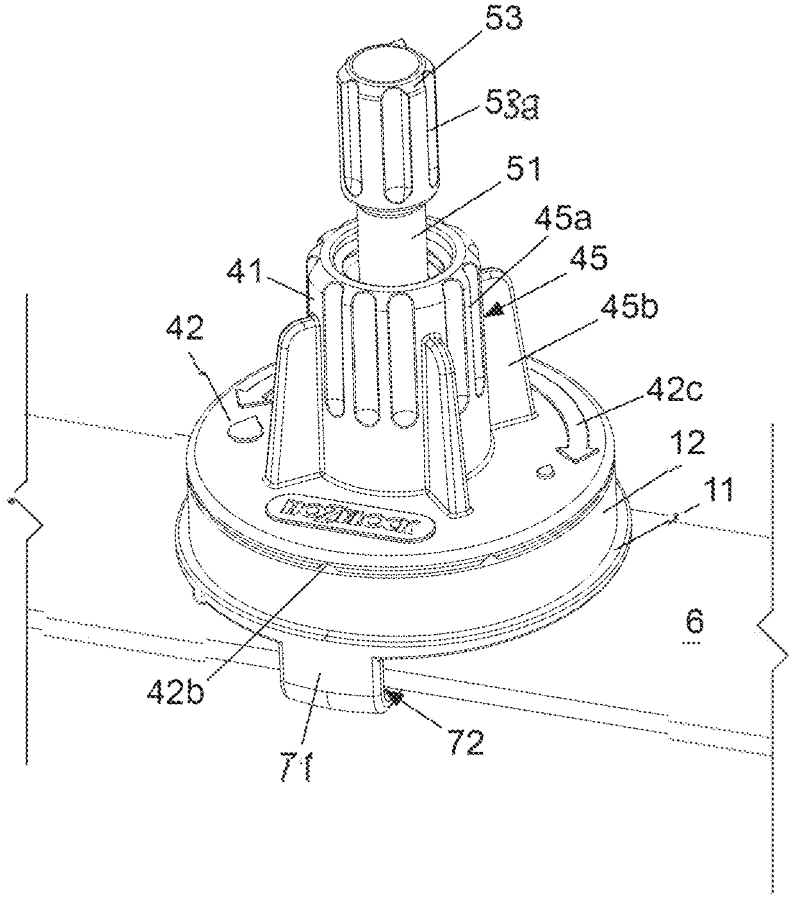
FIG. 4 schematically shows part of the watering device shown in FIGS. 1 to 3 when not mounted in a plant pot.
Figure 5:
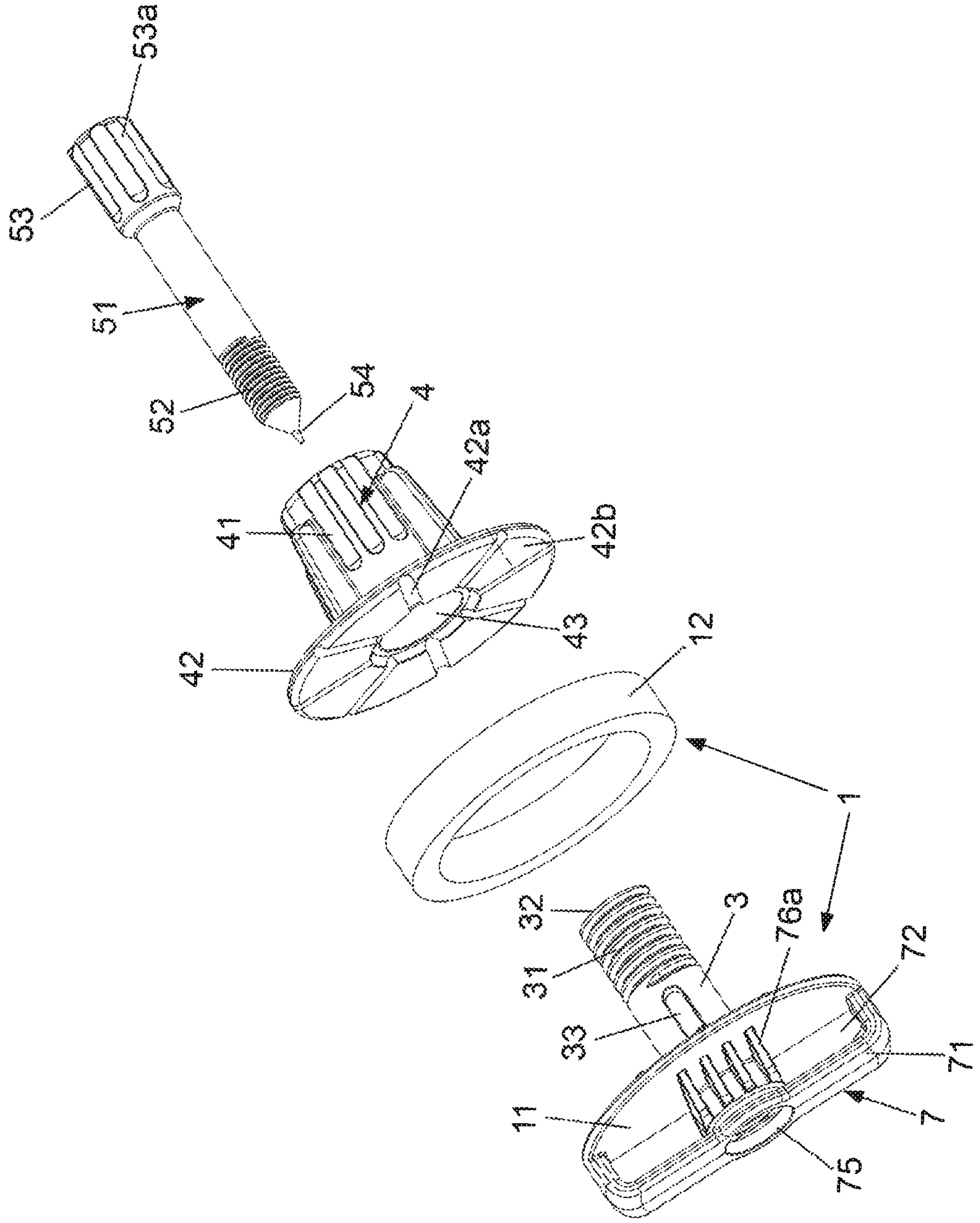
FIG. 5 is an exploded view of the watering device of FIGS. 1 to 4 without a piece of wicking material in place in the device.

As best seen for example in FIGS. 2, 4 and 5, the wicking material receiving portion 7 comprises retaining strip portion 71 which defines a slot 72 for receiving the wicking material 6. In the present embodiment the slot 72 is formed between the plate portion 11 and the retaining strip portion 71.

The wicking material receiving portion 7 further comprises an outlet pocket 73 into which the outlet port 35 feeds. The outlet pocket 73 has a surrounding wall 74 with a distal edge 74*a* that extends into the wicking material receiving slot 72, such that when a piece of wicking material 6 is located in the slot 72 the distal edge 74*a* presses into the wicking material 6.

This can help form a seal against the ingress of dirt/debris into the outlet pocket 73 and hence can help against blocking of the fluid low path through the device. It can also create a low level vacuum or reduced pressure region in the outlet pocket 73 as liquid is wicked away by the wicking material 6 to help maintain flow through the watering device W. This can act against the effects of surface tension/meniscus effects which can inhibit flow at the very low rates that are typically observed in use of the present kind of device.

The retaining strip 71 defines an aperture 75 that is aligned with the outlet pocket 73. The size and shape of the aperture 75 in the strip 71 are the same as that defined by the distal edge 74*a* of the surrounding wall 74 of the outlet pocket 73. In the present embodiment the outlet pocket 73 and the aperture are both circular, and the diameter of the aperture 75 is the same as the internal diameter of the outlet pocket 73.

The aperture can help in securing the wicking material 6 in position. The wicking material 6 can tend to deform into the aperture 75 in the strip 71, which can provide resistance to sliding of the wicking material 6 out of the slot 72.

At least one guiding portion 76 may be provided in the wicking material receiving portion 7 for guiding the insertion of the end of piece of wicking material 6 towards the spacing between the retaining strip 71 and the distal edge 74*a* of the surrounding wall 74 of the outlet pocket 73, when it is being mounted into the wicking material receiving portion 7. In the present embodiment two sets of guiding portions 76 are provided—one each side of the outlet pocket 73—facilitating insertion of the wicking material 6 from either side of the slot 72. Each set of guiding portions 76 comprises a respective plurality of ribs 76*a* with an inclined edge forming a ramp leading to the distal edge 74*a* of the surrounding wall 74 of the outlet pocket 73 (see FIG. 5).

These ribs 76*a* project from the plate portion 11 of the sealing portion 1 in the present embodiment.

Figure 6:
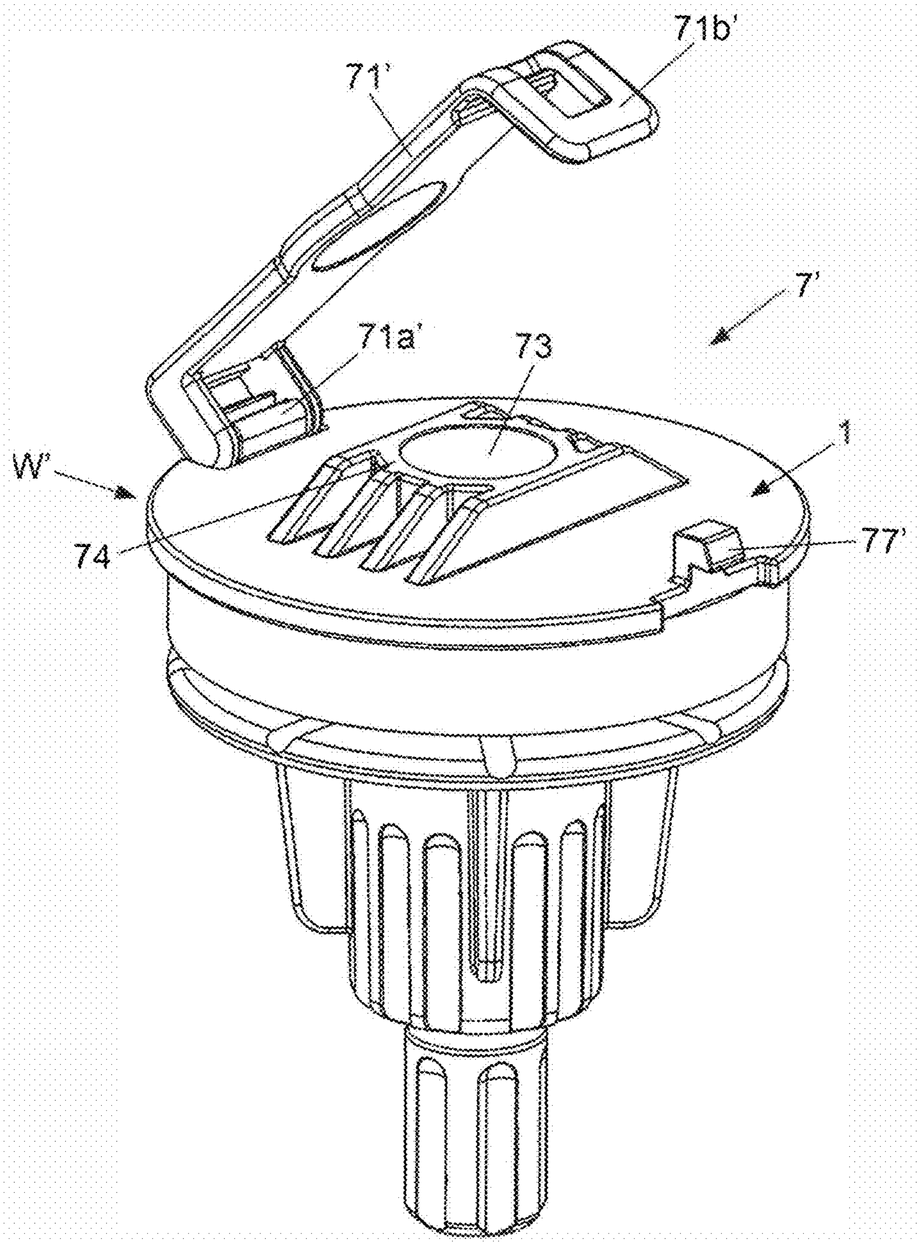
FIG. 6 schematically shows an alternative watering device without a piece of wicking material in place in the device.

FIG. 6 schematically shows an alternative watering device W' without a piece of wicking material in place in the device. The alternative watering device of FIG. 6 is the same as the watering device of FIGS. 1 to 5 in most respects and detailed description of those parts in common is omitted. The alternative watering device of FIG. 6 differs from the watering device of FIGS. 1 to 5 in that a modified form of wicking material receiving portion 7' is provided.

It has been found that with the wicking material receiving portion 7 of the device of FIGS. 1 to 5 it can be difficult for a user to locate a piece of wicking material in the receiving slot 72. Thus in the alternative watering device of FIG. 6 a modified form of retaining strip 71' is provided that is hingedly mounted on the remainder of the watering device W' and arranged to move between an open position (as shown in FIG. 6) allowing the introduction of a piece of wicking material and a closed position (not shown) for holding the wicking material in position.

A first end 71*a*' of the retaining strip 71' is pivotally mounted on the main body of the sealing portion 1—specifically on the plate portion 11. A second end is provided with a catch portion 71*b*' which is arranged to releasably engage with a keeper portion 77' which is provided on the main body of the sealing portion 1—specifically on the plate portion 11. The material of the retaining strip 71' and/or of the catch portion 71*b*' is sufficiently resilient to allow the catch portion 71*b*' to ride over the keeper portion 77' into a latched position for holding the retaining strip 71' in the closed position.

In this closed position the piece of wicking material 6 is clamped in position between the retaining strip 71' and the surrounding wall 74 of the outlet pocket 73.

It has been found that the needle valve 5 of the above embodiments may be susceptible to clogging with dirt and/or debris inside the pot. Thus, in an further alternative watering device W" shown in FIGS. 7 and 8 the needle valve 5 is replaced by a porous ceramic flow regulator 9. The remainder of the device has similarities to that described in relation to FIGS. 1 to 6 above but some constructional differences. The differences are described below whilst description of those parts in common is omitted or abbreviated.

In the further alternative watering device W" shown in FIGS. 7 and 8, there again is a sealing portion 1" and retaining means 2" which comprises a joining portion 3" and a clamping portion 4" but the arrangement is reversed from that of the device shown in FIGS. 1 to 6, in that the sealing portion 1" is arranged to be provided inside the container P as shown in FIG. 7 and the clamping portion 4" is arranged to be provided outside the container P.

Figure 7:
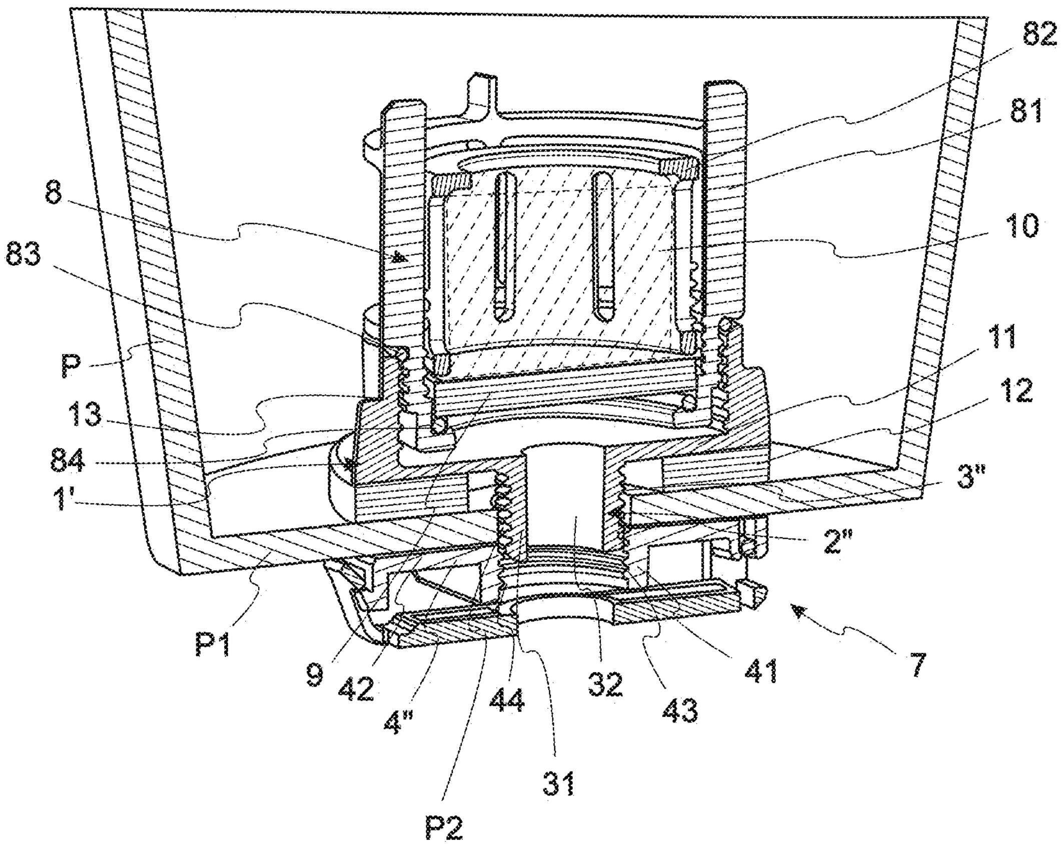
FIG. 7 schematically shows a further alternative watering device without a piece of wicking material in place in the device and when mounted in a container.

The sealing portion 1" again comprises a plate portion 11 and a resilient material sealing ring portion 12 is arranged for sealing against the pot wall P1 around an aperture P2 in the pot wall P1 when the watering device is mounted in a plant pot P as shown in FIG. 7. Again the sealing ring portion 12 may be provided to the consumer as a separate component to the plate portion 11, or may be provided pre-joined to the plate portion—say joined via adhesive or say produced as a co-moulded component.

The joining portion 3" in the present embodiment is again joined with the plate portion 11 of the sealing portion 1" and is arranged for passing through the aperture P2 in a plant pot when mounted as shown in FIG. 7. In the present embodiment the joining portion 3" and the plate portion 11 are formed as a single piece—specifically a plastics material moulded component.

The joining portion 3" is again arranged as a hollow tubular portion in particular, a threaded stem portion 31. A bore 32 is provided within the hollow tubular portion 31. In this embodiment in use water flows into an end of and through this bore 32.

The clamping portion 4" is again arranged to be mounted onto the joining portion 3" and clamp against the opposite side of a pot wall P1 than the sealing portion 1" when the watering device W" is mounted in a pot P as shown in FIG. 7.

The clamping portion 4" again comprises a main body portion 41 and a clamping flange portion 42. The main body portion 41 defines a clamping portion main bore 43. In this embodiment in use water flows out of the bore of the threaded stem portion 31 and into the clamping portion main bore 43.

The main bore 43 of the clamping portion 4" again comprises a complementarily threaded portion 44 which is arranged to threadingly engage with the joining portion 3" so that the clamping portion 4 may be tightened onto the joining portion 3. For completeness it is noted that again these complimentary threads are respectively on the external wall of the stem portion 31 and the internal wall of the main bore 43.

Figure 8:
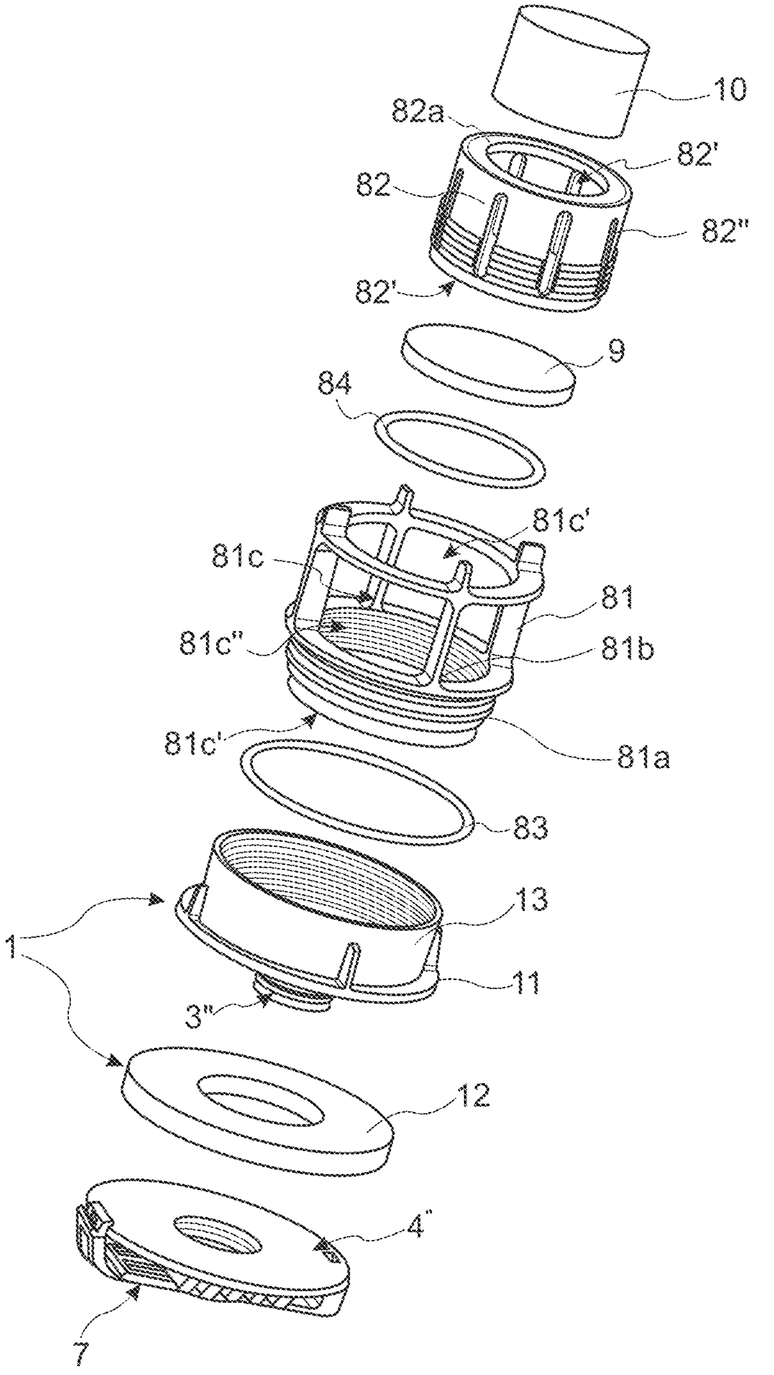
FIG. 8 shows an exploded view of the further alternative watering device of FIG. 7.

The wicking material receiving portion 7 in the further alternative watering device W" shown in FIGS. 7 and 8 is the same as the wicking material receiving portion of the alternative watering device W' shown in FIG. 6 except that it is provided on the clamping portion 4" rather than the sealing portion 1". Thus further description of the wicking material receiving portion 7 is omitted.

As alluded to above, the main difference between the further alternative watering device W" of FIGS. 7 and 8, and those further above is that the needle valve 5 is replaced by a porous ceramic flow regulator 9.

In the present embodiment, the ceramic flow regulator 9 is a ceramic disc located in a support housing 8. The support housing 8 is threadingly engageable with a threaded seat 13 provided on the plate portion 11 of the sealing portion 1". The ceramic disc 9 is provided upstream of the joining portion bore 32. The ceramic disc 9 can therefore control, ie regulate, the flow of water into the joining portion bore 32 and hence through the watering device.

A foam filter 10 is provided in the support housing 8 upstream of the ceramic disc 9. The foam filter 10 has been found to prevent large debris from coming into contact with the ceramic disc 9, thereby reducing the risk of the ceramic disc pores becoming blocked.

However, smaller dirt particles may pass through the foam filter 10. Thus it is useful to be able to obtain access to and clean the ceramic disc 9, and particularly convenient if this can be done by a user without the need to remove the pot P from the watering location.

Therefore, the support housing 8 is removable by a user, that is to say the support housing 8 can detach from the plate portion 11.

Together the support housing 8, ceramic disc 9 and foam filter 10 form a removable cartridge that can be removed from the remainder the watering device, say when installed in a container or pot P. This can facilitate cleaning and/or replacement.

The support housing 8 comprises a housing body 81 and an annular retaining member 82 for retaining the ceramic disc 9 in the housing body 81. In the present embodiment this annular retaining member 82 also retains the foam filter 10, in particular in this case the annular retaining member 82 houses the foam filter 10. The annular retaining member 82 and foam filter 10 together form a removable sub-cartridge within the support housing cartridge mentioned above.

The annular retaining member 81 is threadingly engaged with the housing body 81. Complimentary threads are provided on an external wall of the retaining member 82 and an internal wall of the housing body 81.

An O-ring 83 is provided between the support housing 8 and the plate portion 11. A further O-ring 84 is provided between the ceramic disc 9 and the support housing 8. These O-rings seal between the support housing 8 and the plate portion 11, thus helping ensure that water flowing into the support housing 8 passes through the ceramic disc 9.

The housing body 81 in this embodiment is generally annular. It has a plate engaging portion 81*a*, and ceramic element receiving portion 81*b*, and filter receiving portion 81*c*. The filter receiving portion 81*c* is arranged to be upstream of the ceramic element receiving portion 81*b* and comprises at least one aperture for allowing water to flow into the interior of the housing body 81. In the present embodiment the filter receiving portion 81*c* has respective aperture 81*c*' at its upstream and downstream ends and apertures 81*c*" in its side walls. The filter receiving portion 81*c* is basket like. These features allow retention of the filter whilst encouraging water flow into and through the support housing 8.

The annular retaining member 82 has respective apertures 82' at its upstream and downstream ends and apertures 82" in its side walls. These features allow retention of the filter 10 whilst encouraging water flow into the interior of the annular retaining member 82 and through the annular retaining member 82. A lip 82*a* is provided around the periphery of the aperture 82' at the upstream end of the annular retaining member 82 to assist in retaining the foam filter 10 in the annular retaining member 82.

In use water from the container can flow into the interior of the support housing 8, through the foam filter 10 and to the ceramic disc 9. Here flow is regulated by the porosity of the ceramic disc 9, and the water at the allowed rate can flow into the bore 32 of the joining member 3' and onwards to the wicking material receiving portion 7. Then with the device fully assembled for operation water can be distributed into the surroundings via the wicking material as in the devices mentioned above.

As mentioned the ceramic disc 9 is arranged to control the fluid flow rate through the watering device W". The fluid flow rate through the ceramic disc 9 may be selected by varying the pore size and percentage porosity, the percentage by volume of the component occupied by the pores, of the ceramic disc 9. The fluid flow rate through the ceramic disc 9 may be increased, for example, by increasing the pore size and/or increasing the percentage porosity. In one example, the pore size is 1 μm and the percentage porosity is roughly 40-50%.

In an alternative watering device not shown in the Figures, the ceramic element has a conical shape. In this or other alternatives the ceramic element may engage a remainder of the device directly, thus removing the need for a support housing. In yet other alternatives a support housing may be provided without the present basket like filter receiving structure—and rather say just a circular recess to accept a foam filter element—or further still provided with no filter receiving portion.

Overall the present type of watering devices can allow the user to create an effective, and controllable, watering device arrangement whilst making use of an everyday object (which otherwise might be discarded).

The invention claimed is:

1. A watering device for mounting in a container comprising a sealing portion for mounting against a container wall around an aperture in the container wall, retaining means for holding the sealing portion in position against the container wall, a fluid distribution portion receiving portion for holding a fluid distribution portion at a location outside of a container on which the device is mounted and a flow channel portion for providing a fluid flow path from an interior of a container in which the watering device is mounted to the fluid distribution portion receiving portion, and wherein the fluid distribution portion receiving portion comprises a retaining strip which is movably mounted on a remainder of the watering device and arranged to be moveable between an open position allowing the introduction of a piece of wicking material and a closed position for holding the wicking material in position.

2. A watering device according to claim 1 which comprises a piece of wicking material disposed in the fluid distribution portion receiving portion as a fluid distribution portion.

3. A watering device according to claim 1 which comprises a valve for adjustably controlling the flow through the fluid flow path.

4. A watering device according to claim 1 in which the sealing portion is arranged to be placed against an outside surface of the container wall.

5. A watering device according to claim 1 in which the sealing portion comprises a resilient material ring portion.

6. A watering device according to claim 1 in which the retaining means comprises a clamping member for clamping against a container wall on an opposite side to that against which the sealing portion is arranged to seal.

7. A watering device according to claim 6 in which the clamping member comprises a clamping flange portion for contacting with the container wall against which it is to be clamped.

8. A watering device according to claim 6 in which the retaining means comprises a joining portion for joining the sealing portion to the clamping portion, preferably where the joining portion is arranged for passing through an aperture in a container wall.

9. A watering device according to claim 8 in which the clamping member and sealing portion are threadingly engageable via the joining portion.

10. A watering device according to claim 8 in which the clamping member defines a bore which accepts the joining portion.

11. A watering device according to claim 10 in which the clamping member defines at least one clamping member fluid passage from the exterior of the clamping member into the bore.

12. A watering device according to claim 8 in which the joining portion comprises a joining portion fluid passage for leading fluid through the watering device with an inlet port at one end of the fluid passage and an outlet port at the other end of the fluid passage.

13. A watering device according to claim 12 in which the clamping member defines at least one clamping member fluid passage from the exterior of the clamping member into the bore and the inlet port provides a fluid communication path between the bore of the clamping member and the joining portion fluid passage when the joining portion is located in the bore of the clamping member.

14. A watering device according to claim 12 which comprises a valve for adjustably controlling the flow through the fluid flow path and in which the valve is arranged to control flow in the joining portion fluid passage.

15. A watering device according to claim 1 in which the fluid distribution portion receiving portion comprises a wicking material receiving slot.

16. A watering device according to claim 1 in which the fluid distribution portion receiving portion comprises an outlet pocket into which an outlet feeding fluid to the fluid distribution portion feeds.

17. A watering device according to claim 16 in which the fluid distribution portion receiving portion comprises a wicking material receiving slot and the outlet pocket has a surrounding wall with a distal edge that extends into the wicking material receiving slot, such that when a piece of wicking material is located in the slot the distal edge presses into the wicking material.

18. A watering device according to claim 1 in which the watering device further comprises a porous ceramic element for controlling flow through the fluid flow path.

19. A watering device according to claim 18 wherein the porous ceramic element comprises a ceramic disc.

20. A watering device according to claim 18 wherein the porous ceramic element is removable from a remainder of the watering device by a user.

21. A watering device according to claim 18 wherein the porous ceramic element is retained in a housing, said housing being removable from a remainder of the watering device by a user.

22. A watering device according to claim 18 wherein the watering device further comprises a filter element for filtering water before reaching the porous ceramic element.

23. A watering device according to claim 22 wherein the porous ceramic element is retained in a housing, said housing being removable from a remainder of the watering device by a user and with said filter element being removably retained in the housing.

24. A watering device according to claim 1, wherein the retaining strip is arranged to be latchable in the closed position.

25. A watering device for mounting in a container comprising a sealing portion for mounting against a container wall around an aperture in the container wall, a joining portion for passing through the aperture in a container wall and joining the sealing portion with a clamping portion for holding the sealing portion in position against the container wall wherein the clamping portion and sealing portion are threadingly engageable via the joining portion.

26. A watering device according to claim 25 in which the clamping portion defines a bore which accepts the joining portion.

27. A watering device according to claim 25 in which the watering device further comprises a fluid distribution portion receiving portion for holding a fluid distribution portion at a location outside of a container on which the device is mounted and a flow channel portion for providing a fluid flow path from an interior of a container in which the watering device is mounted to the fluid distribution portion receiving portion, wherein the joining portion comprises at least part of the flow channel portion.

28. A watering device assembly comprising a watering device according to claim 1 mounted on a container with the sealing portion sealing against a wall of the container around an aperture provided in the container.

29. A watering device for mounting in a container comprising a sealing portion for mounting against a container wall around an aperture in the container wall, retaining means for holding the sealing portion in position against the container wall, a fluid distribution portion receiving portion for holding a fluid distribution portion at a location outside of a container on which the device is mounted and a flow channel portion for providing a fluid flow path from an interior of a container in which the watering device is mounted to the fluid distribution portion receiving portion, wherein the fluid distribution portion receiving portion comprises an outlet pocket into which an outlet feeding fluid to the fluid distribution portion feeds, and wherein the fluid distribution portion receiving portion comprises a wicking material receiving slot and the outlet pocket has a surrounding wall with a distal edge that extends into the wicking material receiving slot, such that when a piece of wicking material is located in the slot the distal edge presses into the wicking material.

30. A watering device for mounting in a container comprising a sealing portion for mounting against a container wall around an aperture in the container wall, retaining means for holding the sealing portion in position against the container wall, a fluid distribution portion receiving portion for holding a fluid distribution portion at a location outside of a container on which the device is mounted and a flow channel portion for providing a fluid flow path from an interior of a container in which the watering device is mounted to the fluid distribution portion receiving portion, wherein the watering device further comprises a porous ceramic element comprising a ceramic disc for controlling flow through the fluid flow path, and wherein the porous ceramic element is retained in a housing, said housing being removable from a remainder of the watering device by a user.

31. A watering device according to claim 30, wherein the watering device further comprises a filter element for filtering water before reaching the porous ceramic element and the filter element is removably retained in the housing.

* * * * *